US010406942B2

(12) United States Patent
Kimura

(10) Patent No.: US 10,406,942 B2
(45) Date of Patent: Sep. 10, 2019

(54) SLIDE RAIL DEVICE FOR VEHICLE

(71) Applicant: SHIROKI CORPORATION, Fujisawa-shi, Kanagawa (JP)

(72) Inventor: Akihiro Kimura, Toyokawa (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 116 days.

(21) Appl. No.: 15/640,798

(22) Filed: Jul. 3, 2017

(65) Prior Publication Data
US 2018/0009336 A1 Jan. 11, 2018

(30) Foreign Application Priority Data
Jul. 6, 2016 (JP) ................. 2016-134094

(51) Int. Cl.
B60N 2/07 (2006.01)
B60N 2/08 (2006.01)

(52) U.S. Cl.
CPC ......... B60N 2/0727 (2013.01); B60N 2/0705 (2013.01); B60N 2/0715 (2013.01); B60N 2/08 (2013.01); B60N 2/0818 (2013.01); B60N 2/0875 (2013.01)

(58) Field of Classification Search
CPC .. B60N 2/0727; B60N 2/0705; B60N 2/0715; B60N 2/08; B60N 2/0818; B60N 2/0875; B60N 2/07; B60N 2/0722
See application file for complete search history.

(56) References Cited

U.S. PATENT DOCUMENTS

| | | | | |
|---|---|---|---|---|
| 4,887,785 A * | 12/1989 | Blaich | ................... | A01K 39/00 248/339 |
| 6,182,933 B1 * | 2/2001 | Rapp | ....................... | E04D 13/00 248/231.31 |
| 6,378,827 B1 * | 4/2002 | Kacines | ............... | A47G 29/083 24/546 |
| 6,848,660 B2 * | 2/2005 | Jackson | ................. | A47G 33/10 211/13.1 |
| 7,059,749 B1 * | 6/2006 | Bernier | ................. | F21V 21/088 24/336 |
| 9,016,655 B2 * | 4/2015 | Aoi | ...................... | B60N 2/0705 248/430 |
| 9,145,070 B2 * | 9/2015 | Hayashi | ............... | B60N 2/0705 |
| 9,327,616 B2 * | 5/2016 | Hoshihara | ............ | B60N 2/0856 |
| 9,463,716 B2 * | 10/2016 | Hayashi | .................. | B60N 2/08 |
| 9,469,217 B2 * | 10/2016 | Hayashi | ............... | B60N 2/0705 |
| 9,616,777 B2 * | 4/2017 | Arakawa | ............. | B60N 2/0705 |

(Continued)

FOREIGN PATENT DOCUMENTS

JP 2012-126183 A 7/2012

Primary Examiner — Nkeisha Smith
(74) Attorney, Agent, or Firm — Buchanan Ingersoll & Rooney PC

(57) ABSTRACT

In a slide rail device for use in a vehicle, a lock spring support portion of an upper rail includes an upward-downward movement restriction support portion. The upward-downward movement restriction support portion includes an open holding portion which is open at a top thereof and holds a supported portion of a lock spring and an uplift prevention projection which is formed projecting into the open holding portion so as to overlap the supported portion of the lock spring, which is held by the open holding portion, in the upward and downward directions.

5 Claims, 3 Drawing Sheets

(56) References Cited

U.S. PATENT DOCUMENTS

| | | | | |
|---|---|---|---|---|
| 10,086,721 | B2* | 10/2018 | Arakawa | B60N 2/0705 |
| 2001/0030270 | A1* | 10/2001 | Hartl | A47G 7/045 |
| | | | | 248/219.1 |
| 2004/0129846 | A1* | 7/2004 | Adams | F21V 21/088 |
| | | | | 248/231.81 |
| 2005/0103961 | A1* | 5/2005 | Swanstrom | F16L 3/13 |
| | | | | 248/305 |
| 2012/0144654 | A1* | 6/2012 | Christian | A47G 7/045 |
| | | | | 29/525.08 |
| 2013/0206950 | A1* | 8/2013 | Hayashi | B60N 2/0705 |
| | | | | 248/429 |
| 2013/0264454 | A1 | 10/2013 | Hayashi | |
| 2017/0341535 | A1* | 11/2017 | Taniguchi | B60N 2/0881 |
| 2018/0141466 | A1* | 5/2018 | Goto | B60N 2/0155 |
| 2018/0257515 | A1* | 9/2018 | Taniguchi | B60N 2/0818 |

\* cited by examiner

SLIDE RAIL DEVICE FOR VEHICLE

BACKGROUND OF THE INVENTION

1. Field of the Invention

The present invention relates to a slide rail device for use in a vehicle, more specifically for use with a vehicle seat.

2. Description of Related Art

The basic configuration of a typical slide rail device (slide rail assembly/seat base slider) for use in a vehicle (motor vehicle) is configured of a lower rail which is mounted to a vehicle floor and extends in the forward and rearward directions, an upper rail which is mounted to a vehicle sheet and extends in the forward and rearward directions and a lock mechanism which allows or prevents the upper rail from sliding in the forward and rearward directions relative to the lower rail.

The lock mechanism includes a plurality of lock grooves which are formed on the lower rail so as to be aligned in the forward and rearward directions, a lock spring support portion which is formed on the upper rail and a lock spring which is supported by the upper rail. The lock spring is provided with lock portions which are engaged with and disengaged from the lock grooves and a supported portion which is supported by the lock spring support portion. With the supported portion as a point of support, the lock portions of the lock spring are moved in the upward and downward directions to be engaged with and disengaged from the lock grooves. The lock spring is biased in a direction to bring the lock portions into engagement with the lock grooves.

A lock release lever is supported by the upper rail and can be operated to rotate between a locked position (slide prohibited position), at which the lock portions are engaged with the lock grooves, and an unlocked position (slide permitted position), at which the lock portions are disengaged from the lock grooves.

The supported portion of the lock spring is configured of, e.g., a widthwise shaft which extends in the widthwise direction, and the lock spring support portion of the upper rail is configured of an open holding portion (e. g., a V-shaped or U-shaped groove) which is open at the top and holds the widthwise shaft of the lock spring. The widthwise shaft of the lock spring is biased toward the bottom of the open holding portion. A slide rail device having such a lock mechanism is disclosed in Japanese Unexamined Patent Publication No. 2012-126183.

However, according to diligent research performed by the inventors, it has been found that, in the case where a slide rail device for use in a vehicle changes from an unlocked state to a locked state, a phenomenon in which the impact (energy) produced upon the lock portions of the lock spring coming into engagement with the lock grooves of the lower rail is propagated (transferred) to the supported portion (the widthwise shaft) of the lock spring that is supported by the lock spring support portion (the open holding portion) of the upper rail.

In this case, against its biasing force, the supported portion (the widthwise shaft) of the lock spring springs upward to a position above the lock spring support portion (the open holding portion) of the upper rail, and thereafter being hurled against the bottom of the lock spring support portion (the open holding portion) to consequently generate noise (rattle sound).

Unlike this case, there is a possibility of the supported portion (the widthwise shaft) of the lock spring which has sprung upward becoming incapable of returning into the lock spring support portion (the open holding portion) of the upper rail and thereupon coming into a standstill in a state of having moved onto a portion of the upper rail around the lock spring support portion (the open holding portion). In this case, no influence is exerted on the operation of the slide rail device; however, when the lock release lever is rotationally operated afterwards, the supported portion (the widthwise shaft) of the lock spring is hurled against the bottom of the lock spring support portion (the open holding portion) to thereupon generate noise (rattle sound).

Specifically, when the slide rail device changes from an unlocked state to a locked state, the lock portions of the lock spring run onto lock teeth of the lower rail (that are positioned between the lock grooves) (the slide rail device is still in an unlocked state at this point); sliding the seat (the upper rail) in this state causes the supported portion (the widthwise shaft) of the lock spring to noticeably spring upward when the lock portions of the lock spring come into engagement with the lock grooves of the lower rail.

SUMMARY OF THE INVENTION

The prevent invention has been made based on the awareness of the above-described problems and provides a slide rail device for use in a vehicle which makes it possible to prevent the supported portion (e.g., a widthwise shaft) of the lock spring from springing upward from the lock spring support portion (the open holding portion) of the upper rail and also to prevent noise (rattle sound) which may be caused by this springing of the supported portion of the lock spring from occurring.

According to an aspect of the prevent invention, a slide rail device for use in a vehicle is provided, including: a lower rail which is mounted to a vehicle floor and extends in the forward and rearward directions; an upper rail which is mounted to a vehicle seat and extends in the forward and rearward directions; and a lock mechanism which locks said upper rail to prevent said upper rail from moving in said forward and rearward directions relative to said lower rail and unlocks said upper rail to allow said upper rail to move in said forward and rearward directions relative to said lower rail. The lock mechanism includes: a plurality of lock grooves which are formed on the lower rail and arranged in the forward and rearward directions; a lock spring support portion which is formed on the upper rail; and a lock spring which includes: a lock portion capable of being engaged with and disengaged from the lock grooves; and a supported portion which is supported by the lock spring support portion. The lock spring is biased in a direction to bring the lock portion into engagement with the lock grooves and is configured to be capable of bringing the lock portion into engagement with and disengagement from the lock grooves by moving the lock portion in the upward and downward directions with the supported portion as a support point. The lock spring support portion of the upper rail is configured of an upward-downward movement restriction support portion including: an open holding portion which is open at the top thereof and holds the supported portion of the lock spring; and an uplift prevention projection which is formed projecting into the open holding portion so as to overlap the supported portion of the lock spring, which is held by the open holding portion, in the upward and downward directions.

It is possible that the lock spring support portion be configured of a pair of lock spring support portions which are spaced apart from each other in the widthwise direction of the upper rail, that the supported portion of the lock spring be configured of a widthwise shaft which extends in the widthwise direction of the upper rail, that one of the pair of lock spring support portions be configured of the aforementioned upward-downward movement restriction support portion, and that the other of the pair of lock spring support portions be configured of a forward-rearward movement restriction support portion which comes in contact with the widthwise shaft from the front and rear to hold the widthwise shaft.

The uplift prevention projection of the upward-downward movement restriction support portion can be provided with an inclined surface which is inclined to increase the distance between the inclined surface and the supported portion of the lock spring in the upward and downward directions with respect to a direction toward an open side of the open holding portion The uplift prevention projection of the upward-downward movement restriction support portion can be formed so as to project rearward from the front of the open holding portion.

The upward-downward movement restriction support portion can be substantially L-shaped and include: a lower wall which is positioned below the supported portion of the lock spring; and a front wall which stands upward from the front end of the lower wall, wherein the uplift prevention projection is formed projecting rearward from the upper end of the front wall.

According to an embodiment of the present invention, it is possible to achieve a slide rail device for use in a vehicle which makes it possible to prevent the supported portion (e.g., a widthwise shaft) of the lock spring from springing upward from the lock spring support portion (the open holding portion) of the upper rail and also to prevent noise (rattle sound) which may be caused by this springing of the supported portion of the lock spring from occurring.

The present disclosure relates to subject matter contained in Japanese Patent Application No. 2016-134094 (filed on Jul. 6, 2016) which is expressly incorporated herein by reference in its entirety.

BRIEF DESCRIPTION OF THE DRAWINGS

The present invention will be discussed below in detail with reference to the accompanying drawings, in which.

DESCRIPTION OF THE EMBODIMENT

Figure 1:
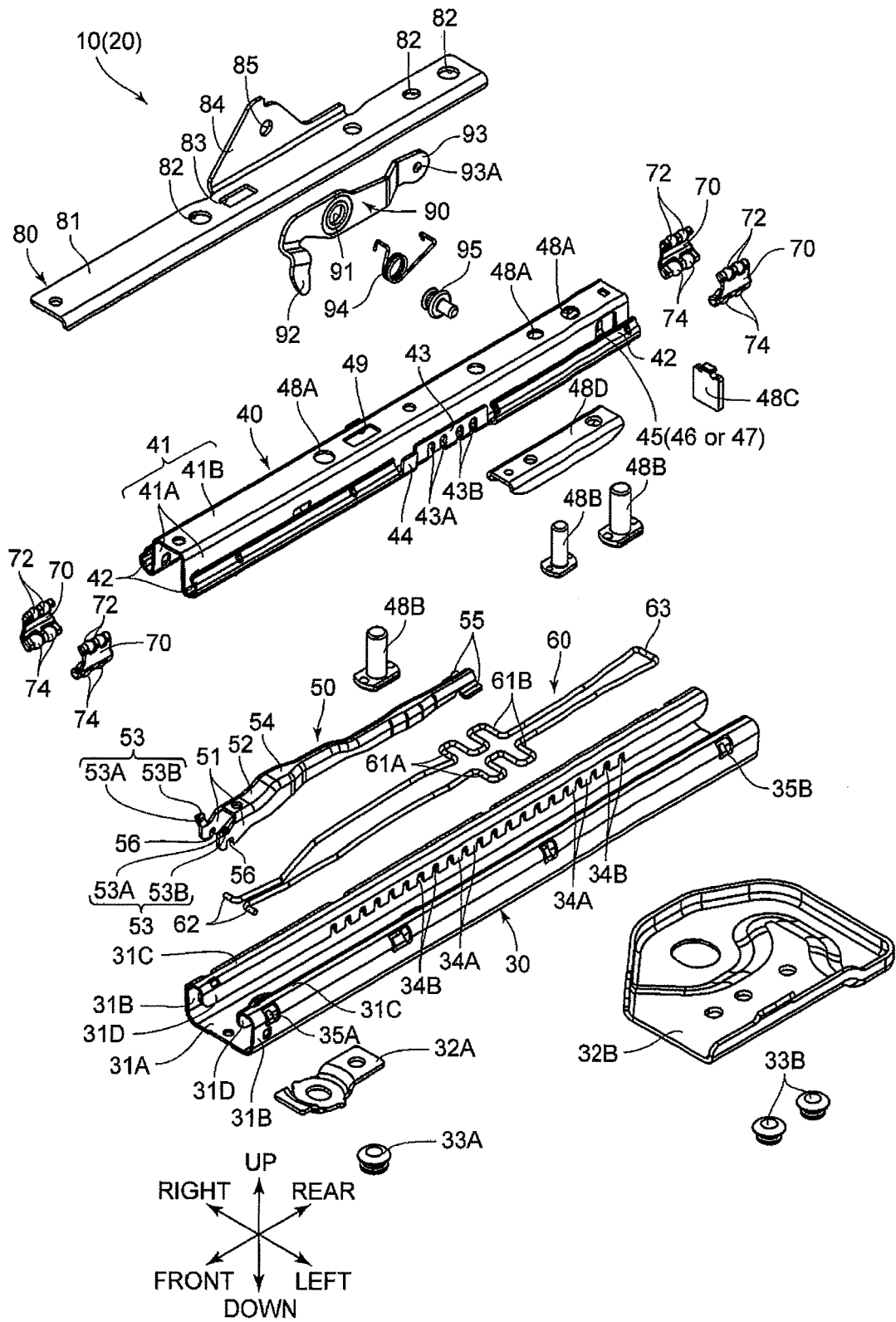
FIG. 1 is an exploded perspective view of an embodiment of a slide rail device (one of a pair of rail units) for use in a vehicle, according to the present invention, viewed obliquely from above.

An embodiment of a slide rail device 10 according to the present invention, which is designed for use with a vehicle seat, will be hereinafter discussed with reference to FIGS. 1 through 7. Note that the directions described in the following description are defined based on the directions of arrows shown in the drawings.

The slide rail device 10 is provided with a pair of left and right rail units 20 (only one of the left and right rail units 20 is shown in FIG. 1). A vehicle seat (not shown) is supported by the pair of left and right rail units 20. The pair of left and right rail units 20 basically have a common shape (are basically bilaterally symmetrical in shape), so that only one of the pair of rail units 20 will be discussed hereinafter.

The rail unit 20 (the slide rail device 10) is provided with a lower rail 30 which is fixed onto a vehicle floor. The lower rail 30 is a metal channel member which is open at the top and extends in the forward and rearward directions. The lower rail 30 is provided with a bottom wall 31A, a pair of outer walls 31B, a pair of top walls 31C and a pair of inner walls 31D. The bottom wall 31A is formed into a substantially-horizontal plate, the pair of outer walls 31B extend upward from either side of the bottom wall 31A in the leftward and rightward directions (widthwise direction), the pair of top walls 31C bend inwardly from the pair of outer walls 31B, and the pair of inner walls 31D bend downward from the pair of top walls 31C to extend toward the bottom wall 31A. The rail unit 20 is provided with a front bracket 32A and a rear bracket 32B which are fixed to the vehicle floor, and the bottom wall 31A of the lower rail 30 is fixed to the front bracket 32A and the rear bracket 32B via a front rivet 33A and rear rivets 33B. With this structure, the lower rail 30 is fixedly mounted to the vehicle floor.

Lower edge portions of the pair of inner walls 31D of the lower rail 30 are each provided with a large number of lock teeth 34A which are arranged at equal intervals in the forward and rearward directions, and lock grooves (elements of a lock mechanism) 34B which are open at the lower ends thereof are formed between the adjacent lock teeth 34A. The lower rail 30 is provided, on the connecting portion (boundary portion) between each outer wall 31B and the associated top wall 31C, with a front-end stopper (lanced lug) 35A and a rear-end stopper (lanced lug) 35B which are positioned in the vicinity of the front and rear ends of the lower rail 30, respectively, and which are formed by cutting and raising (lancing) portions of the aforementioned connecting portion.

The rail unit 20 (the slide rail device 10) is provided with an upper rail 40 which is mounted to a vehicle seat (which includes a seat back and seat cushion). The upper rail 40 is supported to be slidable in the forward and rearward directions with respect to the lower rail 30. The upper rail 40 is formed of a metal channel member which extends in the forward and rearward directions and is open at the bottom. The upper rail 40 is provided with a base 41, a pair of upright walls 42, a pair of lock walls 43 and a pair of stopper walls 44. The base 41 has a substantially inverted U-shaped cross section and consists of a pair of left and right side walls 41A that are substantially parallel to each other and a top wall 41B which connects the upper ends of the left and right side walls 41A. The upright walls 42 extend upward from lower end portions of the left and right side walls 41A which exclude central portions thereof in the longitudinal direction of the upper rail 40, the lock walls 43 extend upward from the aforementioned center portions of the lower ends of the left and right side walls 41A, and the stopper walls 44 are formed at positions immediately in front of the lock walls 43 (each stopper wall 44 is formed at a position between the adjacent lock wall 43 and a front half of the adjacent upright wall 42 in the longitudinal direction of the upper rail 40).

A total of four forward-rearward movement restriction grooves: two forward-rearward movement restriction grooves 43A and two forward-rearward movement restriction grooves 43B are formed over the lower edge of each lock wall 43 and the lower edge of the associated side wall 41A of the base 41 to extend upward. The upper rail 40 is provided at rear portions of the left and right side walls 41A of the base 41 with a pair of rear lock-engaging lugs (elements of the lock mechanism/lock spring support portions) 45 which extend inward and subsequently upward. The pair of rear lock-engaging lugs (lanced lugs) 45 are formed by cutting and raising (lancing) portions of the left and right side walls 41A. The pair of rear lock-engaging lugs 45 are configured of a forward-rearward movement restriction support portion 46 and an upward-downward movement restriction support portion 47 which are arranged to be spaced apart from each other in the leftward and rightward directions (widthwise direction) of the upper rail 40. The detailed structure and the operation and effect of the pair of rear lock-engaging lugs 45 (the forward-rearward movement restriction support portion 46 and the upward-downward movement restriction support portion 47) will be discussed later. The upper rail 40 is provided, at portions of the left and right side walls 41A of the base 41 in front of central portions thereof, with a pair of front lock-engaging lugs (lanced lugs) (not shown) which are projected inward and formed by cutting and raising (lancing) portions of the left and right side walls 41A.

Three bolt insertion holes (through-holes) 48A are formed in the top wall 41B of the base 41 of the upper rail 40 to be aligned in the forward and rearward directions. Three fixing bolts 48B are inserted into the three bolt insertion holes 48A from below. The upper rail 40 is fixedly mounted to a vehicle seat by fastening the three fixing bolts 48B to a component on the vehicle seat side. The upper rail 40 is provided, on the rear end of the inner surface of the base 41, with a rear-end cover member 48C which prevents the left and right side walls 41A of the base 41 from being deformed inwardly (in the opposite direction toward each other). A metal-made inner reinforcement 48D for improving rigidity of the upper rail 40 is fixed to the inner surface of the base 41 at a position in front of the rear-end cover member 48C. A lock-lug insertion hole (through-hole) 49 in the shape of a substantially rectangle which is short in the leftward and rightward direction and long in the forward and rearward directions is formed in the top wall 41B of the base 41 at a position a little in front of the central portion of the top wall 41B in the forward and rearward directions.

The rail unit 20 is provided with a lock release lever (an element of the lock mechanism) 50 which is installed to the upper rail 40. The lock release lever 50 is a press-molded metal channel member, formed from a metal plate, which extends in the forward and rearward directions and is open at the bottom. The lock release lever 50 has a substantially inverted U-shaped cross section and is provided with a pair of left and right side walls 51 that are substantially parallel to each other and an upper wall 52 which connects the left and right side walls 51. A portion of the lock release lever 50 in the vicinity of the front end thereof consists solely of front end portions of the left and right side walls 51; in other words, the upper wall 52 does not cover the front end of the lock release lever 50. The lock release lever 50 is provided at the upper front ends of the left and right side walls 51 with a pair of left and right anti-rattle projections 53 which minimizes the clearance between the lock release lever 50 and the inner surfaces of the left and right side walls 41A of the base 41 of the upper rail 40 to prevent the upper rail 40 and the lock release lever 50 from rattling relative to each other in the leftward and rightward direction (widthwise direction) when the lock release lever 50 is installed to the upper rail 40. The pair of left and right anti-rattle projections 53 consist of a pair of left and right inclined portions 53A which extend obliquely upward and outward in directions away from each other from the upper front ends of the left and right side walls 51 and a pair of anti-rattle lugs 53B which project upward from the upper ends of the pair of left and right inclined portions 53A along the inner surfaces of the left and right side walls 41A of the base 41. The lock release lever 50 is provided on top thereof with a rotational contact protrusion (raised portion) 54 which is widened in the leftward and rightward directions and protrudes upward. The lock release lever 50 is provided at the rear end thereof with a pair of left and right spring pressing lugs 55. The pair of left and right spring pressing lugs 55 are shaped like flat plates that are formed by laterally bending lower ends of the pair of left and right side walls 51. Upwardly-recessed spring-hook grooves 56 are formed in the lower edges of front portions (portions of the left and right side walls 51 which are positioned forward from the rotational contact protrusion 54) of the left and right side walls 51, respectively.

The rail unit 20 is provided with a lock spring (an element of the lock mechanism) 60 which is installed to the upper rail 40. The lock spring 60 is a bilaterally-symmetrical member formed by bending a single metal wire material. The lock spring 60 is provided, on a portion of each of the left and right sides thereof at positions slightly rearward from a central portion of the lock spring 60 with respect to the longitudinal direction thereof, with a pair of front and rear locking portions 61A and 61B (the lock spring 60 is provided with a total of four locking portions 61A and 61B) which extend outwardly and substantially horizontally. The portion of the lock spring 60 which is positioned forward from the front locking portions 61A and the portion of the lock spring 60 which is positioned rearward from the rear locking portions 61B are substantially horizontal in a free state. The lock spring 60 is provided at the front end thereof with a pair of left and right front-end locking lugs 62 which extend outwardly in a substantially horizontal direction. The lock spring 60 is further provided at the rear end thereof with a rear-end lock-engaging portion (supported portion/ widthwise shaft) 63 which extends in the leftward and rightward directions (widthwise direction) in a plan view.

The lock release lever 50 is almost entirely accommodated in the upper rail 40 from the front end opening thereof, and the rotational contact protrusion 54 is in contact with the top wall 41B of the base 41 of the upper rail 40. On the other hand, space (clearance) is formed between the top surface of the lock release lever 50, except the rotational contact protrusion 54 thereof, and the top wall 41B of the base 41 of the upper rail 40.

The lock spring 60 is supported by the upper rail 40 and the lock release lever 50 in a manner which will be discussed hereinafter. The rear-end lock-engaging portion (widthwise shaft) 63 of the lock spring 60 is inserted, from above, into the left and right rear lock-engaging lugs 45 (i.e., the forward-rearward movement restriction support portion 46 and the upward-downward movement restriction support portion 47) of the upper rail 40 (the details will be discussed later), the portion of the lock spring 60 which is positioned forward from the locking portions 61A and 61B on both the left and right sides of the lock spring 60 are brought into lock-engagement with the aforementioned pair of (left and right) front lock-engaging lugs (not shown) of the upper rail 40, the locking portions 61A and 61B on both the left and right sides of the lock spring 60 are brought into engagement with the corresponding forward-rearward movement restriction grooves 43A and 43B of the upper rail 40 from below, the left and right front-end locking lugs 62 of the lock spring 60 are brought into lock-engagement with the spring-hook grooves 56 of the lock release lever 50 from below, and the left and right spring pressing lugs 55 of the lock release lever 50 are brought to abut against upper surfaces of the left and right front locking portions 61A of the lock spring 60. In a locked state, the front locking portions 61A and the rear locking portions 61B of the lock spring 60 are engaged in the forward-rearward movement restriction grooves 43A and the forward-rearward movement restriction grooves 43B, respectively, and further engaged in the lock grooves 34B of the lower rail 30. The front locking portions 61A and the rear locking portions 61B of the lock spring 60 partly extend through the lock grooves 34B of the lower rail 30 and the forward-rearward movement restriction grooves 43A and 43B of the upper rail 40 to project into the inside of the base 41 of the upper rail 40 (into the space between the pair or side walls 41A).

The lock spring 60 installed to the upper rail 40 and the lock release lever 50 in the above described manner is resiliently deformed to produce an upward biasing force (resiliency). This biasing force causes the rotational contact protrusion 54 of the lock release lever 50 to be pressed against the top wall 41B of the base 41 of the upper rail 40, which enables the lock release lever 50 to rotate about the rotational contact protrusion 54 with the contact portion between the top wall 41B and the rotational contact protrusion 54 as a rotation center, and the lock release lever 50 is held in the locked position when no downward external force is exerted on the portion of the lock release lever 50 which is positioned rearward from the rotational contact protrusion 54, which is formed on a top surface of the lock release lever 50. When the lock release lever 50 is in the locked position, the locking portions 61A and 61B of each of the left and right sides of the lock spring 60 are engaged in the lock grooves 34B of the associated inner wall 31D of the lower rail 30. Additionally, a component force of the biasing force produced by the resilient deformation of the lock spring 60 acts as a biasing force which biases the periphery of the rear-end lock-engaging portion (widthwise shaft) 63 downward, and this component force biases and moves the rear-end lock-engaging portion (widthwise shaft) 63 toward the lower ends of the pair of rear lock-engaging lugs 45 (the forward-rearward movement restriction support portion 46 and the upward-downward movement restriction support portion 47) (the details will be discussed later).

On the other hand, exerting a downward external force on the portion of the lock release lever 50 which is positioned rearward from the rotational contact protrusion 54, which is formed on a top surface of the lock release lever 50, against the biasing force of the lock spring 60 causes the lock release lever 50 to rotate to the unlocked position about the contact portion between the top wall 41B and the rotational contact protrusion 54. Thereupon, the pair of spring pressing lugs 55 of the lock release lever 50 depresses the lock spring 60, which causes the lock spring 60 to be resiliently deformed downwardly with the rear-end lock-engaging portion (widthwise shaft) 63, which is supported by the pair of rear lock-engaging lugs 45 (the forward-rearward movement restriction support portion 46 and the upward-downward movement restriction support portion 47) of the upper rail 40 (the details will be discussed later), and the portion of the lock spring 60 which is supported by the aforementioned pair of front lock-engaging lugs (not shown) of the upper rail 40 as support points, thereby causing the front locking portions 61A and the rear locking portions 61B of the lock spring 60 to be disengaged downward from the associated lock grooves 34B (forward-rearward movement restriction grooves 43A and the forward-rearward movement restriction grooves 43B), respectively.

When the lower rail 30, the upper rail 40, the lock release lever 50 and the lock spring 60 are assembled by inserting the upper rail 40, the lock release lever 50 and the lock spring 60 which are combined as a unit into the inside of the lower rail 30 from the front end opening or the rear end opening thereof, the upright walls 42 and the lock walls 43 of the rail unit 40 enter the spaces formed between the outer walls 31B and the inner walls 31D of the lower rail 30, and bearing balls 72 that are rotatably supported by retainers 70 installed in these spaces come in rotatable contact with the outer surfaces of the upright walls 42 and the inner surfaces of the outer walls 31B. At the same time, bearing balls 74 that are rotatably supported by the retainers 70 are rotatably supported in the spaces (corner portions) each formed between the boundary portion between the bottom wall 31A and one outer wall 31B of the lower rail 30 and the boundary portion between the base 41 and the associated upright wall 42 (or the associated lock wall 43) of the lower rail 40. This makes it possible for the upper rail 40 (a combination of the upper rail 40, the lock release lever 50 and the lock spring 60) to slide in the forward and rearward directions with respect to the lower rail 30, specifically makes it possible for the upper rail 40 (a combination of the upper rail 40, the lock release lever 50 and the lock spring 60) to slide in the range of movement between the front end position at which the left and right stopper walls 44 come in contact with the front-end stoppers 35A and the rear end position at which the left and right stopper walls 44 come in contact with the rear-end stoppers 35B. The lower rail 30 is provided, at positions on imaginary extensions of the retainers 70 in the forward and rearward directions, with lanced lugs (not shown) which restrict the sliding movements of the retainers 70 and the bearing balls 72 in the forward and rearward directions relative to the lower rail 30.

The rail unit 20 is provided with a lock member support bracket 80 which is fixed to the upper rail 40. The lock member support bracket 80 is provided with a base 81 in the shape of a flat plate which is substantially identical in dimension to the top wall 41B of the base 41 and is mounted on the top surface of the top wall 41B. The base 81 of the lock member support bracket 80 is provided, at three positions corresponding to the positions of the three bolt insertion holes 48A of the upper rail 40, with three bolt insertion holes (through-holes) 82 and is further provided, at a position corresponding to the position of the lock-lug insertion hole 49, with a lock-lug insertion hole (through-hole) 83 which is substantially identical in shape and size to the lock-lug insertion hole 49 in a plan view. The lock member support bracket 80 is provided, at a central portion of the right edge of the base 81 in the forward and rearward directions, with a lock member support wall 84 which stands upright, extending in the upward direction. A rotation support hole 85 is formed through the lock member support wall 84.

The rail unit 20 is provided with a lock member 90 which is rotatably supported by the lock member support wall 84 of the lock member support bracket 80. The lock member 90 is provided at a central portion thereof with a rotation support hole 91 and further provided, at one end and the other end on the opposite sides of the rotation support hole 91 in the direction of the length of the lock member 90, with a pressing lock lug 92 and a wire holding lug 93, respectively. The lock member 90 is supported on a rotation support shaft 95 which is inserted into the rotation support holes 85 and 91 with the rotation support holes 85 and 91 aligned, a torsion spring 94 is fitted, at the coil portion thereof, onto the rotational support shaft 95 with one end and the other end of the torsion spring 90 respectively engaged with the lock member 90 and the lock member support bracket 80, and the lock member 90 is supported by the lock member support wall 84 to be rotatable about the rotation support shaft 95 while receiving the biasing force of the torsion spring 94 in the clockwise direction as viewed from the left side. The lock member 90 is provided in the wire holding lug 93 with a wire holding hole 93A with which one end of a wire rope (not shown) is fixedly engaged, and pulling the other end of this wire rope with a wire rope pulling mechanism (not shown) causes the lock member 90 to rotate in the counterclockwise direction as viewed from the left side against the biasing force of the torsion spring 94.

The pressing lock lug 92 of the lock member 90 is inserted into the lock-lug insertion hole 83 of the lock member support bracket 80 and the lock-lug insertion hole 49 of the upper rail 40 to be positioned immediately above a rear portion of the rotational contact protrusion 54, which is formed on a top surface of the lock release lever 50, to be capable of coming into and out of contact with the rear portion of the rotational contact protrusion 54. In a state where the lock member 90 receives the clockwise biasing force from the torsion spring 94 without being pulled via the wire rope pulling mechanism (not shown), the pressing lock lug 92 of the lock member 90 does not press (is in noncontact with) the rear portion of the rotational contact protrusion 54, which is formed on a top surface of the lock release lever 50, so that the lock release lever 50 is held in the locked position. On the other hand, rotating the lock member 90 in the counterclockwise direction against the biasing force of the torsion spring 94 by operating the wire rope pulling mechanism (not shown) causes the pressing lock lug 92 of the lock member 90 to depress the rear portion of the rotational contact protrusion 54, which is formed on a top surface of the lock release lever 50, to thereby rotate the lock release lever 50 to the unlocked position about the contact portion between the top wall 41B and the rotational contact protrusion 54.

In the slide rail device 10 that is constructed as described above, upon release of the above described pulling operation of the wire rope pulling mechanism after making an adjustment to the slide position of the upper rail 40 relative to the lower rail 30 in a state where the lock release lever 50 is in the unlocked position, the lock release lever 50 rotates from the unlocked position to the locked position. At this time, the impact (energy) produced upon engagement of the locking portions 61A and 61B of the lock spring 60 in the lock grooves 34B of the lower rail 30 is propagated (transferred) to the rear-end lock-engaging portion (widthwise shaft) 63 of the lock spring 60 that is supported by the rear lock-engaging lugs 45 of the upper rail 40.

As a result, without the characteristic structure (shape) (which will be discussed later) of the rear lock-engaging lugs 45 of the upper rail 40 of the present embodiment, there is a possibility of the rear-end lock-engaging portion (widthwise shaft) 63 of the lock spring 60 springing upward, against its own biasing force, to a position above the rear lock-engaging lugs 45 of the upper rail 40 and thereafter being hurled against the bottoms of the rear lock-engaging lugs 45 of the upper rail 40 to thereupon generate noise (rattle sound), or there is a possibility of the rear-end lock-engaging portion (widthwise shaft) 63 of the lock spring 60 which has sprung upward becoming incapable of returning to the bottoms of the rear lock-engaging lugs 45 of the upper rail 40 and thereupon coming into a standstill in a state of having moved onto a portion(s) of the upper rail 40 around the bottoms of the rear lock-engaging lugs 45. In this case, no influence is exerted on the operation of the slide rail device 10; however, when the wire rope pulling mechanism (not shown) is operated (to pull the other end of the aforementioned wire rope) afterwards, there is a possibility of the rear-end lock-engaging portion (widthwise shaft) 63 of the lock spring 60 being hurled against the bottoms of the rear lock-engaging lugs 45 of the upper rail 40 to thereupon generate noise (rattle sound).

Accordingly, in the present embodiment of the slider rail device 10, to prevent the rear-end lock-engaging portion (widthwise shaft) 63 of the lock spring 60 from springing upward from the rear lock-engaging lugs 45 of the upper rail 40 and prevent noise (rattle sound) which may be caused by this upward springing from occurring, novel ideas have been added to the structure (shape) of the rear lock-engaging lugs 45 of the upper rail 40. The details of the novel ideas will be hereinafter discussed with reference to FIGS. 2 through 7.

The rear lock-engaging lugs (lock spring support portions) 45 are configured of a pair of lugs spaced apart from each other in the leftward and rightward directions (widthwise direction) of the upper rail 40: one of which is the forward-rearward movement restriction support portion 46 that is for restricting movement of the rear-end lock-engaging portion (widthwise shaft) 63 of the lock spring 60 in the forward and rearward directions and the other is the upward-downward movement restriction support portion 47 that is for restricting movement of the rear-end lock-engaging portion (widthwise shaft) 63 of the lock spring 60 in the upward and downward directions.

Figure 2:
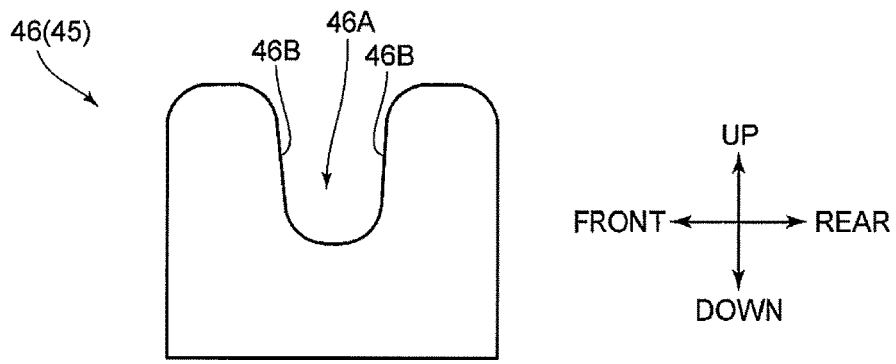
FIG. 2 is a diagram showing the shape of a forward-rearward movement restriction support portion formed on an upper rail shown in FIG. 1 as viewed in the leftward/rightward direction (widthwise direction)

As shown in FIG. 2, the forward-rearward movement restriction support portion 46 is provided with a downward-pointing V-shaped (specifically truncated V-shaped) groove 46A. The forward-rearward movement restriction support portion 46 is provided, in the V-shaped groove 46A at the front and rear thereof, with front and rear support surfaces 46B, respectively, which are longitudinally symmetrical, and the V-shaped groove 46A progressively decreases in width in the downward direction. The width between the front and rear support surfaces 46B at the deepest part of the V-shaped groove 46A is identical to or slightly smaller than the diameter of the rear-end lock-engaging portion (widthwise shaft) 63 of the lock spring 60.

Figure 3:
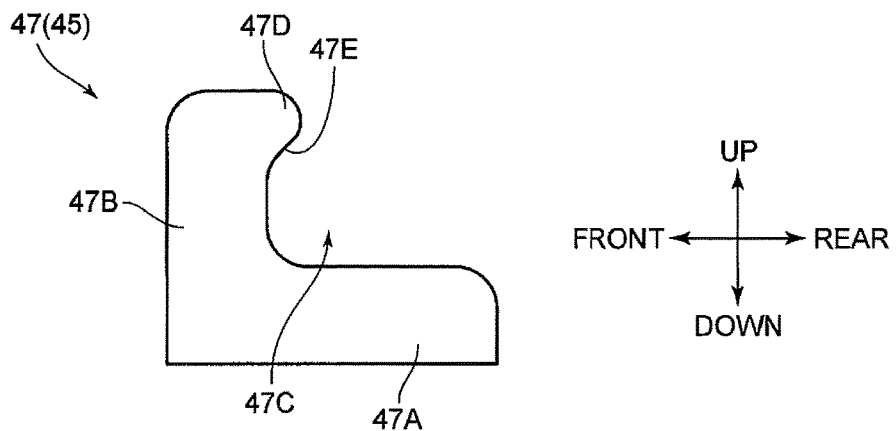
FIG. 3 is a diagram showing the shape of an upward-downward movement restriction support portion formed on the upper rail as viewed in the leftward/rightward direction (widthwise direction)

As shown in FIG. 3, the upward-downward movement restriction support portion 47 is substantially L-shaped and provided with a lower wall 47A and a front wall 47B which stands upward from the front end of the lower wall 47A, and the lower wall 47A and the front wall 47B form an open holding portion (open holding space) 47C which is open at the top. The upward-downward movement restriction support portion 47 is further provided at the upper end of the front wall 47B with an uplift prevention projection 47D which is formed projecting rearward from the front of the open holding portion 47C, which is formed by the lower wall 47A and the front wall 47B. The uplift prevention projection 47D is provided with an inclined surface 47E which is inclined obliquely rearwardly upward with respect to an upward direction from the open holding portion 47C. The inclined angle of the inclined surface 47E can be set at approximately 45 degrees with respect to a horizontal plane. Providing the uplift prevention projection 47D with the inclined surface 47E makes it possible to easily mount the rear-end lock-engaging portion (widthwise shaft) 63 of the lock spring 60 to the upward-downward movement restriction support portion 47.

Figure 4:
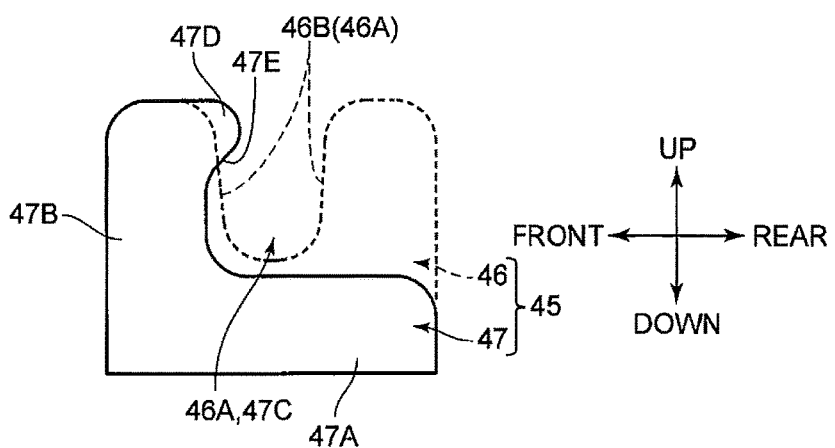
FIG. 4 is a diagram showing the shapes of the forward-rearward movement restriction support portion and the upward-downward movement restriction support portion as viewed in the leftward/rightward direction (widthwise direction), wherein the forward-rearward movement restriction support portion is shown by a dashed line and the upward-downward movement restriction support portion is shown by a solid line.

When the forward-rearward movement restriction support portion 46 and the upward-downward movement restriction support portion 47 are viewed in the leftward/rightward direction (widthwise direction) as shown in FIG. 4, the major portion of the V-shaped groove 46A (the front and rear support surfaces 46B) of the forward-rearward movement restriction support portion 46 lies within the open holding portion 47C of the upward-downward movement restriction support portion 47, and only the uplift prevention projection 47D (the inclined surface 47E) of the upward-downward movement restriction support portion 47 enters the inside of the V-shaped groove 46A of the forward-rearward movement restriction support portion 46 and projects obliquely rearwardly upward from the front.

Figure 5:
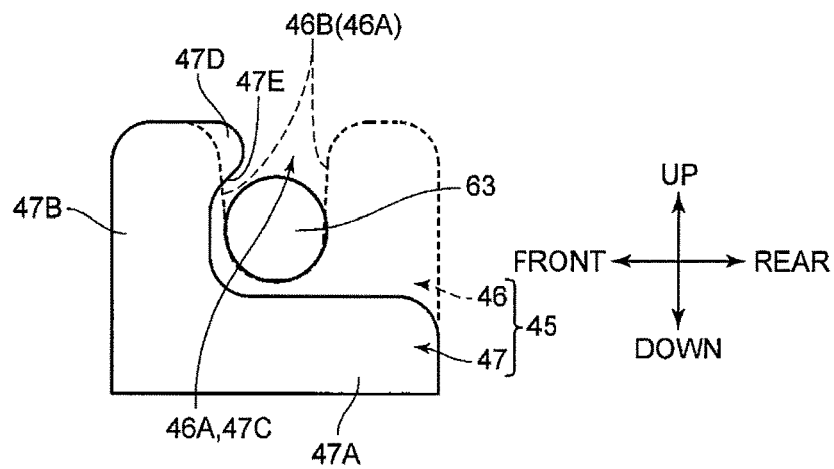
FIG. 5 is a diagraph showing a state where a rear-end lock-engaging portion (widthwise shaft) formed as part of a lock spring (shown in FIG. 1) is supported on the forward-rearward movement restriction support portion and the upward-downward movement restriction support portion.

FIG. 5 shows a state where the rear-end lock-engaging portion (widthwise shaft) 63 of the lock spring 60 is supported by the forward-rearward movement restriction support portion 46 and the upward-downward movement restriction support portion 47 of the upper rail 40. In this state, the front and rear support surfaces 46B, which are formed at the front and rear of the V-shaped groove 46A, come in contact with a portion of the rear-end lock-engaging portion (widthwise shaft) 63 of the lock spring 60 which is close to the forward-rearward movement restriction support portion 46 of the upper rail 40 from the front and rear to hold the rear-end lock-engaging portion (widthwise shaft) 63 of the lock spring 60 in the V-shaped groove 46A. On the other hand, on the upward-downward movement restriction support portion 47 side, the open holding portion 47C (the lower wall 47A and the front wall 47B) holds a portion of the rear-end lock-engaging portion (widthwise shaft) 63 of the lock spring 60 which is close to the upward-downward movement restriction support portion 47 of the upper rail 40, and the uplift prevention projection 47D is positioned to overlap the portion of the rear-end lock-engaging portion (widthwise shaft) 63 of the lock spring 60 which is close to the upward-downward movement restriction support portion 47 of the upper rail 40 in the upward and downward directions. Additionally, the inclined surface 47E of the uplift prevention projection 47D is inclined to increase the distance between the inclined surface 47E and the rear-end lock-engaging portion (widthwise shaft) 63 of the lock spring 60 in the upward and rearward directions with respect to the direction toward the open side of the open holding portion 47C (toward the end of the uplift prevention projection 47D) (the inclined surface 47E is inclined to extend obliquely rightwardly upward with respect to FIG. 5).

As described above, rotation of the lock release lever 50 from the unlocked position to the locked position causes the impact (energy) produced upon engagement of the locking portions 61A and 61B of the lock spring 60 in the lock grooves 34B of the lower rail 30 to be propagated (transferred) to the rear-end lock-engaging portion (widthwise shaft) 63 of the lock spring 60 that is supported by the pair of rear lock-engaging lugs 45 of the upper rail 40. More specifically, the impact (energy) propagated (transferred) to the rear-end lock-engaging portion (widthwise shaft) 63 of the lock spring 60 has a vector component such as a component of force which pulls the rear-end lock-engaging portion (widthwise shaft) 63 forward and upward.

Figure 6:
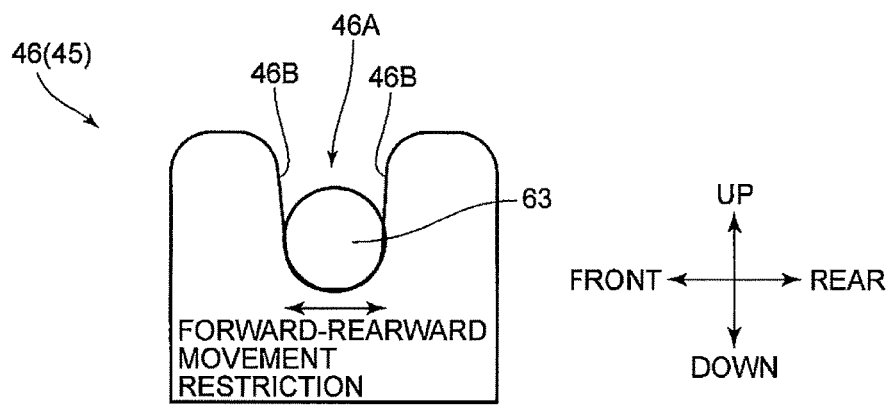
FIG. 6 is a diagram corresponding to that of FIG. 2, illustrating restrictions imposed on movements of the rear-end lock-engaging portion (widthwise shaft) of the lock spring in the forward and rearward directions by the forward-rearward movement restriction support portion of the upper rail.

As shown in FIG. 6, at the forward-rearward movement restriction support portion 46 of the upper rail 40, since the front and rear support surfaces 46B, which are formed at the front and rear of the V-shaped groove 46A, come in contact with the rear-end lock-engaging portion (widthwise shaft) 63 of the lock spring 60 from the front and rear to hold the rear-end lock-engaging portion (widthwise shaft) 63 of the lock spring in the V-shaped groove 46A as described above, the forward-rearward movement restriction support portion 46 can receive the forward pulling force exerted on the rear-end lock-engaging portion (widthwise shaft) 63 of the lock spring 60 and prevent the rear-end lock-engaging portion (widthwise shaft) 63 of the lock spring 60 from moving in the forward and rearward directions relative to the forward-rearward movement restriction support portion 46.

Figure 7:
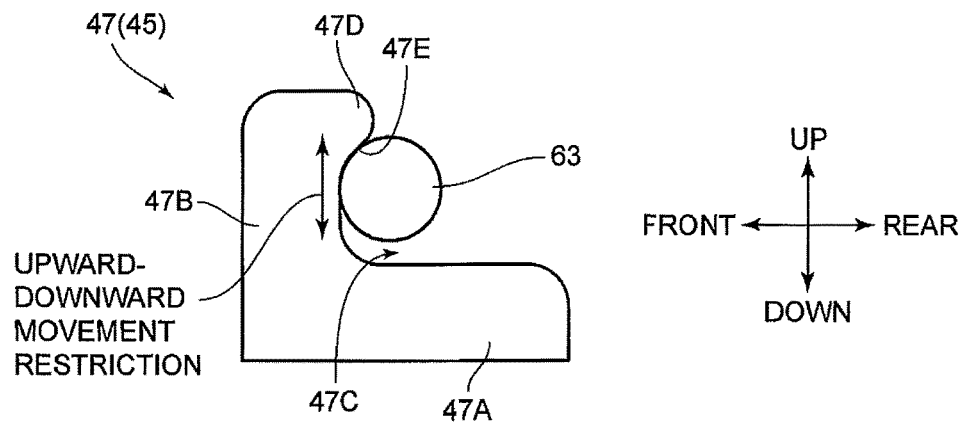
FIG. 7 is a diagram corresponding to that of FIG. 3, illustrating restrictions on movements of the rear-end lock-engaging portion (widthwise shaft) of the lock spring in the upward and downward direction by the upward-downward movement restriction support portion of the upper rail.

As shown in FIG. 7, at the upward-downward movement restriction support portion 47 of the upper rail 40, since the uplift prevention projection 47D is formed at the upper end of the front wall 47B to project rearward from the front of the open holding portion 47C so as to overlap a portion of the rear-end lock-engaging portion (widthwise shaft) 63 of the lock spring 60 which is close to the upward-downward movement restriction support portion 47 of the upper rail 40 in the upward and downward directions, the upward pulling force exerted on the rear-end lock-engaging portion (widthwise shaft) 63 of the lock spring 60 is blocked by the uplift prevention projection 47D, which makes it possible to restrict movement of the rear-end lock-engaging portion (widthwise shaft) 63 in the upward and downward directions. Additionally, at the upward-downward movement restriction support portion 47 of the upper rail 40, the front wall 47B restricts forward movement of the rear-end lock-engaging portion (widthwise shaft) 63 of the lock spring 60, while the lower wall 47A receives the downward basing force exerted on the rear-end lock-engaging portion (widthwise shaft) 63 of the lock spring 60.

As described above, in the present embodiment of the slide rail device 10, the pair of left and right rear lock-engaging lugs (lock spring support portions) 45 of the upper rail 40 is divided into two: the forward-rearward movement restriction support portion 46, which takes charge of restricting movement of the rear-end lock-engaging portion (widthwise shaft) 63 of the lock spring 60 in the forward and rearward directions, and the upward-downward movement restriction support portion 47, which takes charge of restricting movement of the rear-end lock-engaging portion (widthwise shaft) 63 of the lock spring 60 in the upward and downward directions. This makes it possible to maintain operational stability of the slide rail device 10 and also to prevent the rear-end lock-engaging portion (widthwise shaft) 63 of the lock spring 60 from springing upward from the rear lock-engaging lugs 45 of the upper rail 40 and prevent noise (rattle sound) which may be caused by this upward springing from occurring.

Although the slide rail device 10, in which the "supported portion" of the lock spring 60 is configured of the widthwise shaft (the rear-end lock-engaging portion 63), has been illustrated above as an embodiment of a slide rail device for use in a vehicle according to the present invention, the "supported portion" of the lock spring 60 is flexible in structure; various modifications to the structure thereof are possible. For instance, the "supported portion" of the lock spring 60 can also be formed as a shaft (s) extending in the forward and rearward directions.

The slide rail device 10, in which the upward-downward movement restriction support portion 47 is substantially L-shaped including the lower wall 47A and the front wall 47B which stands upward from the front end of the lower wall 47A has been illustrated above as an embodiment of a slide rail device for use in a vehicle according to the present invention. However, the upward-downward movement restriction support portion 47 is flexible in shape so long as it includes the open holding portion, which is open at the top and capable of holding the rear-end lock-engaging portion (widthwise shaft) 63 of the lock spring 60; for instance, the upward-downward movement restriction support portion 47 can also be substantially L-shaped including a lower wall and a rear wall which stands upward from the rear end of the lower wall, or substantially U-shaped including a lower wall and front and rear walls which respectively project upward from the front and rear ends of the lower wall. In addition, the uplift prevention projection 47D can be formed into not only the above described shape that projects rearward from the upper end of the front wall but also a different shape, e.g., a shape such that it projects forward from the upper end of the rear wall or is configured of a pair of projections which project toward each other from the upper ends of the front and rear walls. In short, the uplift prevention projection only has to be formed into a projection (or projections) overlapping the widthwise shaft of the lock spring, which is held in the open holding portion, in the upward and downward directions.

Although the slide rail device 10, in which the inclined angle of the inclined surface 47E is set at approximately 45 degrees with respect to a horizontal plane, the angle of the inclined surface 47E can be flexibly set; various modifications to the design thereof are possible. Alternatively, the uplift prevention projection 47D can be formed projecting horizontally to have a horizontal surface, not an inclined surface such as the inclined surface 47E.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A slide rail device for use in a vehicle, comprising:
   a lower rail which is mounted to a vehicle floor and extends in forward and rearward directions;
   an upper rail which is mounted to a vehicle seat and extends in said forward and rearward directions; and
   a lock mechanism which locks said upper rail to prevent said upper rail from moving in said forward and rearward directions relative to said lower rail and unlocks said upper rail to allow said upper rail to move in said forward and rearward directions relative to said lower rail,
   wherein said lock mechanism comprises:
   a plurality of lock grooves which are formed on said lower rail and arranged in said forward and rearward directions;
   a lock spring support portion which is formed on said upper rail; and
   a lock spring which includes: a lock portion capable of being engaged with and disengaged from said lock grooves; and a supported portion which is supported by said lock spring support portion,
   wherein said lock spring is biased in a direction to bring said lock portion into engagement with said lock grooves and is configured to be capable of bringing said lock portion into engagement with and disengagement from said lock grooves by moving said lock portion in upward and downward directions with said supported portion as a support point, and
   wherein said lock spring support portion of said upper rail comprises an upward-downward movement restriction support portion including: an open holding portion which is open at a top thereof and holds said supported portion of said lock spring; and an uplift prevention projection which is formed projecting into said open holding portion so as to overlap said supported portion of said lock spring, which is held by said open holding portion, in said upward and downward directions.

2. The slide rail device according to claim 1, wherein said lock spring support portion comprises a pair of lock spring support portions which are spaced apart from each other in a widthwise direction of said upper rail,
   wherein said supported portion of said lock spring comprises a widthwise shaft which extends in said widthwise direction of said upper rail,
   wherein one of said pair of lock spring support portions comprises said upward-downward movement restriction support portion, and
   wherein the other of said pair of lock spring support portions comprises a forward-rearward movement restriction support portion which comes in contact with said widthwise shaft from front and rear to hold said widthwise shaft.

3. The slide rail device according to claim 1, wherein said uplift prevention projection of said upward-downward movement restriction support portion comprises an inclined surface which is inclined to increase a distance between said inclined surface and said supported portion of said lock spring in said upward and downward directions with respect to a direction toward an open side of said open holding portion.

4. The slide rail device according to claim 1, wherein said uplift prevention projection of said upward-downward movement restriction support portion projects rearward from front of said open holding portion.

5. The slide rail device according to claim 1, wherein said upward-downward movement restriction support portion is substantially L-shaped and comprises:
   a lower wall which is positioned below said supported portion of said lock spring; and
   a front wall which stands upward from a front end of said lower wall, and
   wherein said uplift prevention projection is formed projecting rearward from an upper end of said front wall.

* * * * *